United States Patent [19]
Ito et al.

[11] Patent Number: 5,768,065
[45] Date of Patent: Jun. 16, 1998

[54] THIN FILM MAGNETIC HEAD

[75] Inventors: Noriyuki Ito; Yuzuru Iwai; Mikio Matsuzaki; Junichi Sato, all of Tokyo, Japan

[73] Assignee: TDK Corporation, Tokyo, Japan

[21] Appl. No.: 252,526

[22] Filed: Jun. 1, 1994

Related U.S. Application Data

[63] Continuation of Ser. No. 984,510, Dec. 2, 1993, abandoned.

[30] Foreign Application Priority Data

Jan. 28, 1992 [JP] Japan .................. 4-037288

[51] Int. Cl.$^6$ .................................................. G11B 5/39
[52] U.S. Cl. .................................................. 360/113
[58] Field of Search .................................. 360/113, 125, 360/126

[56] References Cited

U.S. PATENT DOCUMENTS

| | | | |
|---|---|---|---|
| 3,908,194 | 9/1975 | Romankiw | 360/113 |
| 3,921,217 | 11/1975 | Thompson | 360/113 |
| 3,975,772 | 8/1976 | Lin | 360/113 |
| 4,438,470 | 3/1984 | Sawada et al. | 360/113 |
| 4,504,880 | 3/1985 | Church et al. | 360/113 |
| 4,623,867 | 11/1986 | Lundquist | 360/113 |
| 4,698,711 | 10/1987 | Vinal | 360/113 |
| 4,885,649 | 12/1989 | Das | 360/113 |
| 4,907,114 | 3/1990 | Shiiki et al. | 360/113 |
| 4,967,298 | 10/1990 | Mowry | 360/113 |
| 5,168,409 | 12/1992 | Koyama et al. | 360/113 |
| 5,218,497 | 6/1993 | Tanabe et al. | 360/113 |
| 5,309,304 | 5/1994 | Naberhuis et al. | 360/113 |

OTHER PUBLICATIONS

IBM Technical Disclosure Bulletin, "Magnetoresistive Element", vol. 18, No. 8, Jan. 1976, W. McCormick, A.E. Moxley and L.R. Weaver, pp. 2431–2432.

Patent Abstracts of Japan, vol. 8 No. 91, (E–241) Apr. 26, 1984 & JP-A-59 009 986, Jan. 19, 1984 "Thin Film Magnetoelectric Transducer", Kaminaka Nobumasa.

Patent Abstracts of Japan, vol. 9, No. 323, (P–414)(2046), Dec. 18, 1985 & JP-A-60 147 915, Aug. 5, 1985 "Magnetoresistance Effect Head", Takanari Tanabe.

Patent Abstracts of Japan, vol. 9, No. 259, (P–397) Oct. 17, 1985 & JP-A-60 107 718, Jun. 13, 1985 "Thin Film Reproducing Head", Kazutoshi et al.

*Primary Examiner*—Stuart S. Levy
*Assistant Examiner*—William R. Korzuch
*Attorney, Agent, or Firm*—Oblon, Spivak, McClelland, Maier & Neustadt, P.C.

[57] ABSTRACT

A thin film magnetic head having a slider and a magnetic transducing element for reading, wherein the slider is provided with an air bearing surface; the magnetic transducing element for reading includes conductor films, a magnetoresistive element and magnetic shield films and is provided on the slider; the conductor films are composed of two conductor films contiguously arranged interposing a first spacing and a second spacing, the first spacing being disposed on the side of the air bearing surface specifying a track width, the second spacing being disposed on the backward side of the first spacing; the magnetoresistive element is connected between the first and the second conductor films crossing the first spacing; the magnetic shield films include a lower magnetic shield film and an upper shield film, the lower magnetic shield film being located on the lower side of the conductor films and the magnetoresistive element and the upper magnetic shield film being located on the upper side of the conductor films and the magnetoresistive element; and the conductor films are arranged so that a size of the second spacing is equal to or less than 10 μm.

5 Claims, 3 Drawing Sheets

THIN FILM MAGNETIC HEAD

This application is a Continuation of application Ser. No. 07/984,510, filed on Dec. 2, 1992, now abandoned.

BACKGROUND OF THE INVENTION

1. Field of the Invention

This invention relates to a thin film magnetic head, particularly to an improvement of a thin film magnetic head employing a magnetoresistive element as a read element.

2. Discussion of the Background

Conventionally, as a thin film magnetic head, one employing an inductive thin film magnetic transducing element as a read/write element, is best known. In the thin film magnetic head employing the inductive thin film magnetic transducing element, it is necessary to increase a relative speed between a magnetic disk and a magnetic head, or to increase a turn number of a coil to obtain a high read output. However, since there is a tendency of downsizing the magnetic disk, the increase of the read output by the increase of the relative speed does not correspond to the current tendency. The increase of the read output by the increase of the turn number of a coil invites increases of an inductance and a DC resistance of a coil, which deteriorates a high-frequency characteristic thereof and is not adapted to a high-speed reading of the head. As a means of solving the problem, a technology is proposed wherein a read element is composed of a magnetoresistive element, and the inductive thin film magnetic transducing element is utilized exclusively for writing. As publicly-known technical literatures, for instance, Japanese Examined Patent Publication No. 35088/1984, Japanese Examined Patent Publication No. 1846/1989 and the like are pointed out.

The magnetic transducing element for reading disclosed in the publicly-known literatures, includes conductor films, a magnetoresistive element and magnetic shield films. The conductor films are provided in two, contiguously arranged and being spaced apart from each other. First end sides thereof are disposed on the side of the slider opposing a medium and second end sides thereof are led backwardly. The magnetoresistive element is connected between the conductor films at the first ends of the conductor films. The magnetic shield films include a lower magnetic shield film and an upper magnetic shield film, which are arranged to interpose the conductor films and the magnetoresistive element through non-magnetic electrically insulating films.

In the reading operation thereof, a constant DC current (hereinafter sensing current) flows in the magnetoresistive element through the conductor films, and a change of a magnetic field of a magnetic disk is detected as a change of an electric resistance of the magnetoresistive element. The magnetic shield films shield an influence of outside magnetic field on the magnetoresistive element in the reading operation, especially an influence of a magnetic field generated by other transition regions of magnetization reversal.

In the read element employing the magnetoresistive element, there is a current circuit including the conductor films and the magnetoresistive element which is interposed by the lower magnetic shield film and the upper magnetic shield film. Therefore, when magnetic fluxes generated by a magnetic field of a record of the magnetic disk pass through a gap between the conductor films situated between the lower magnetic shield film and the upper magnetic shield film, the magnetic fluxes interlink with a single turn coil constructed by the conductor films and the magnetoresistive element and an electromotive force is generated by the single turn coil constructed by the conductor films and the magnetoresistive element. In the conventional thin film magnetic head, since the distance between the conductor films is wide, an area for interlinking which the magnetic fluxes pass through is enhanced, a number of the interlinking magnetic fluxes is increased and the electromotive force is increased. This electromotive force is superposed on an original read signal voltage obtained by the electroresistive element, and varies the read signal. In the above publicly-known literatures, no means for preventing a transducing action of the above induced magnetism is disclosed.

SUMMARY OF THE INVENTION

It is an object of the present invention to solve the above problem and to provide a thin film magnetic head which restrains the transducing action of the induced magnetism of the single turn coil composed of the conductor films and the magnetoresistive element having the magnetic shield films as a core and minimizing the variation of the read signal.

According to an aspect of the present invention, there is provided a thin film magnetic head having a slider and a magnetic transducing element for reading, wherein the slider is provided with an air bearing surface; the magnetic transducing element for reading includes conductor films, a magnetoresistive element and magnetic shield films and is provided on the slider; the conductor films are composed of two conductor films contiguously arranged interposing a first spacing and a second spacing, the first spacing being disposed on the side of the air bearing surface specifying a track width, the second spacing being disposed on the backward side of the first spacing; the magnetoresistive element is connected between the first and the second conductor films crossing the first spacing; the magnetic shield films include a lower magnetic shield film and an upper shield film, the lower magnetic shield film being located on the lower side of the conductor films and the magnetoresistive element and the upper magnetic shield film being located on the upper side of the conductor films and the magnetoresistive element; and the conductor films are arranged so that a size of the second spacing is equal to or less than 10 µm.

The conductor films provided in two, are contiguously arranged being spaced apart from each other by the first spacing and the second spacing. The first spacing is disposed on the side of the air bearing surface, specifying the track width. The second spacing is disposed on the backward side of the first spacing. The magnetoresistive element is connected between the conductor films crossing the first spacing. With respect to the magnetic shield films, the lower magnetic shield film is disposed on the lower side of the conductor films and the magnetoresistive element, whereas the upper magnetic shield film is disposed on the upper side of the conductor films and the magnetoresistive element. The conductor films are arranged so that the size of the second spacing is equal to or less than 10 µm. Therefore, the sectional area of the second spacing between the conductor films situated between the lower magnetic shield film and the upper magnetic shield film, is reduced. The interlinking area which the magnetic fluxes generated based on the recorded magnetic field of the magnetic disk is then reduced. Accordingly, the number of magnetic fluxes interlinking the single turn coil constructed by the conductor films and the magnetoresistive element is minimized. The electromotive force of the single turn coil becomes negligibly small and the variation of the original read signal voltage obtained by the magnetoresistive element is minimized.

DESCRIPTION OF THE PREFERRED EMBODIMENTS

Figure 1:
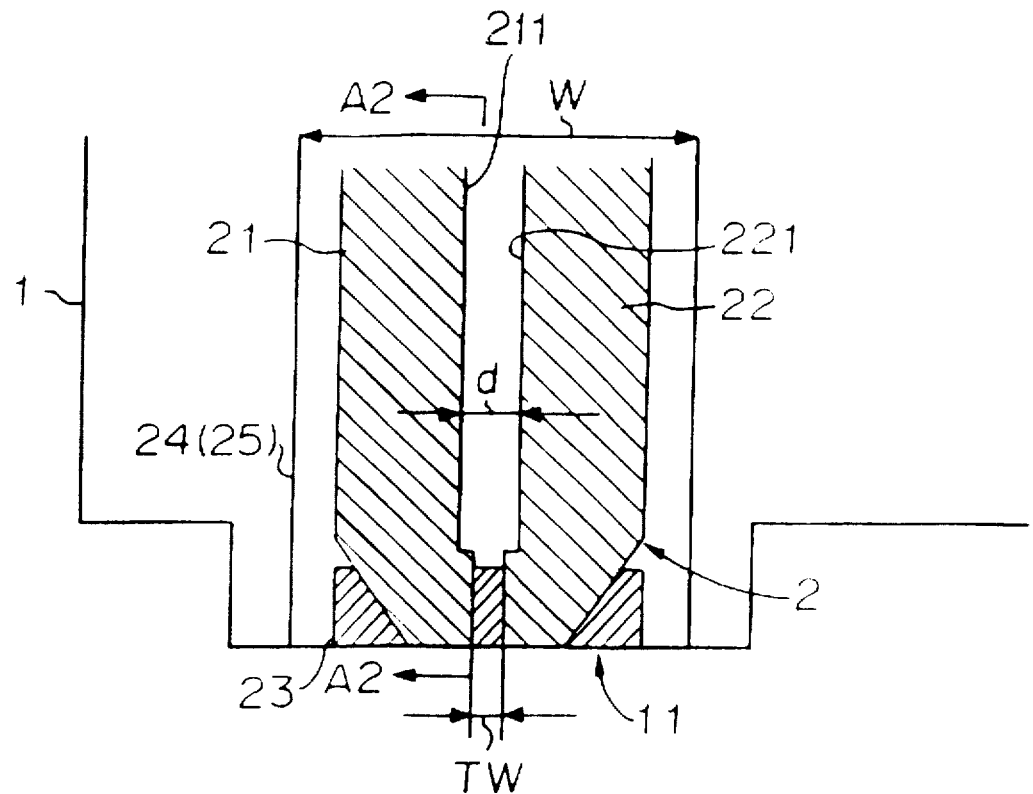
FIG. 1 is a diagram showing the construction of a thin film magnetic head of this invention, as a model.
Figure 2:
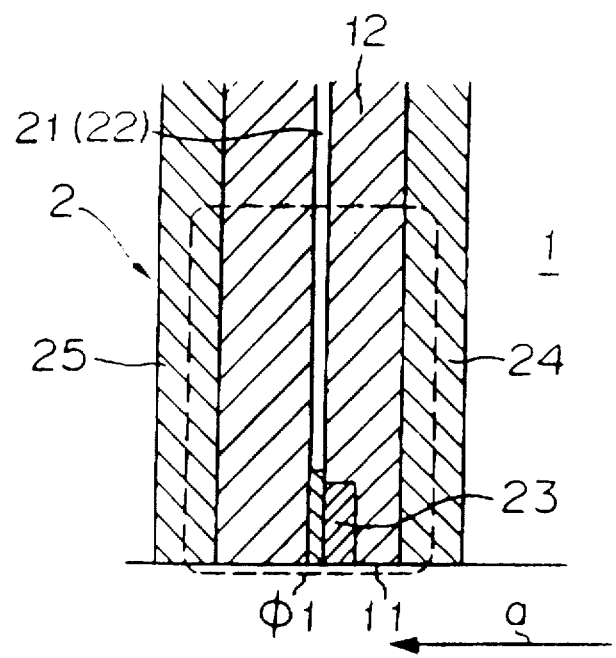
FIG. 2 is a sectional side view taken along a line A2—A2 of FIG. 1.

FIG. 1 is a plane view showing the construction of a thin film magnetic head of this invention as a model, and FIG. 2 is a sectional side view of FIG. 1. A reference numeral 1 designates a slider, 2, a magnetic transducing element for reading and an arrow mark a, the running direction of a magnetic disk. The slider 1 is provided with an air bearing surface 11 having a high surface smoothness on the side of a face thereof opposing a medium.

The magnetic transducing element for reading 2 includes conductor films 21 and 22, a magnetoresistive element 23 and magnetic shield films 24 and 25, which is attached to a side face of the slider 1. The side face of the slider provided with the magnetic transducing element for reading 2 is normally placed on the side of the air discharge direction (medium running direction), shown by the arrow mark a in the combination thereof with a magnetic record medium such as a magnetic disk.

The conductor films 21 and 22 are contiguously arranged in approximately parallel with the side face of the slider 1 spaced apart from each other, on electrically insulating films 12 constituting a portion of the slider 1. The spacing thereof includes a first spacing TW and a second spacing d, wherein the first spacing TW is disposed on the side of the air bearing surface 11 and specifies a track width, and the second spacing d is disposed on the backward side of the first spacing TW.

A magnetoresistive element 23 is connected between the conductor films 21 and 22 crossing the first spacing TW. Magnetic shield films include a lower magnetic shield film 24 and an upper magnetic shield film 25. The lower magnetic shield film 24 is disposed on the lower side of the conductor films 21 and 22 and the magnetoresistive element 23 through the electrically insulating film 12 which is a portion of the slider 1, whereas the upper magnetic shield film 25 is disposed on the upper side of the conductor films 21 and 22 and the magnetoresistive element 23 through the electrically insulating film 12. A notation W designates a width between the magnetic shield films 24 and 25.

The conductor films 21 and 22 are disposed so that a size of the second spacing d is equal to or less than 10 µm. The lower limit value of the size of the second spacing d is determined in view of securing electrical insulation between the conductor films 21 and 22, easiness in a pattern formation in photolithography and the like, and is practically equal to or more than 5 µm. In this illustration, a general example is shown wherein the size of the second spacing d is larger than that of the first spacing TW. However, in selecting the dimension of the second spacing d, the size of the second spacing d may be almost equal to that of the first spacing TW. Furthermore, in the illustrated conductor films 21 and 22, inner side rims 211 and 221 thereof specifying the second spacing d are in a linear form.

In the reading operation, a sensing current I flows in the magnetoresistive element 23 through the conductor films 21 and 22, and a change of a magnetic field of a magnetic disk (not shown) is detected as a change of an electric resistance value of the magnetoresistive element 23. In the reading operation, the lower magnetic shield film 24 and the upper magnetic shield film 25 shield an influence of a magnetic field generated by other transition regions of magnetization reversal.

Since the conductor films 21 and 22 are arranged so that the size of the second spacing d is equal to or less than 10 µm, owing to the size of the second spacing d, a sectional area between the conductor films 21 and 22 situated between the lower magnetic shield film 24 and the upper magnetic shield film 25 is reduced, and, therefore, an interlinkage area which the fluxes $\phi 1$ generated based on the recorded magnetic field of a magnetic disk (not shown) is also reduced. Accordingly, the number of fluxes interlinking with the single turn coil constructed by the conductor films 21 and 22 and the magnetoresistive element 23 is minimized, the electromotive force generated at the single turn coil becomes negligibly small and the variation of the original read signal voltage obtained by the magnetoresistive element 23 is minimized. In the conventional thin film magnetic head, the size of the second spacing d is wide, the interlinkage area for passing the fluxes $\phi 1$ is large and the number of the interlinking flux is large. Therefore, the electromotive force is increased.

Figure 3:
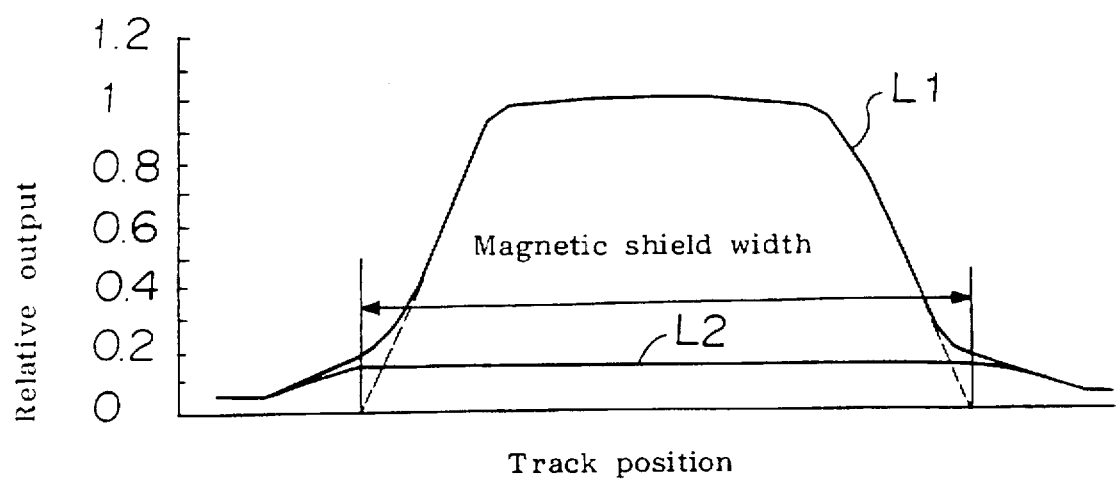
FIG. 3 is a diagram showing actual measurement data of the waveforms of read signals when a current flowing in a magnetoresistive element is maintained as $I_s=0$.

FIG. 3 is a diagram showing actual measurement data of readout waveforms of signals when the current flowing in the magnetoresistive element is maintained as $I_s=0$. In FIG. 3, the ordinate designates a relative output, the abscissa, a track position. A curve L1 designates a characteristic of the conventional thin film magnetic head, and L2, that of the invented thin film magnetic head. As is clearly shown by the curve L1, in the conventional thin film magnetic head, the relative output is almost equal to 1 in a region within the width of the magnetic shield film W. By contrast, in the invented thin film magnetic head, almost no output is generated.

Figure 4:
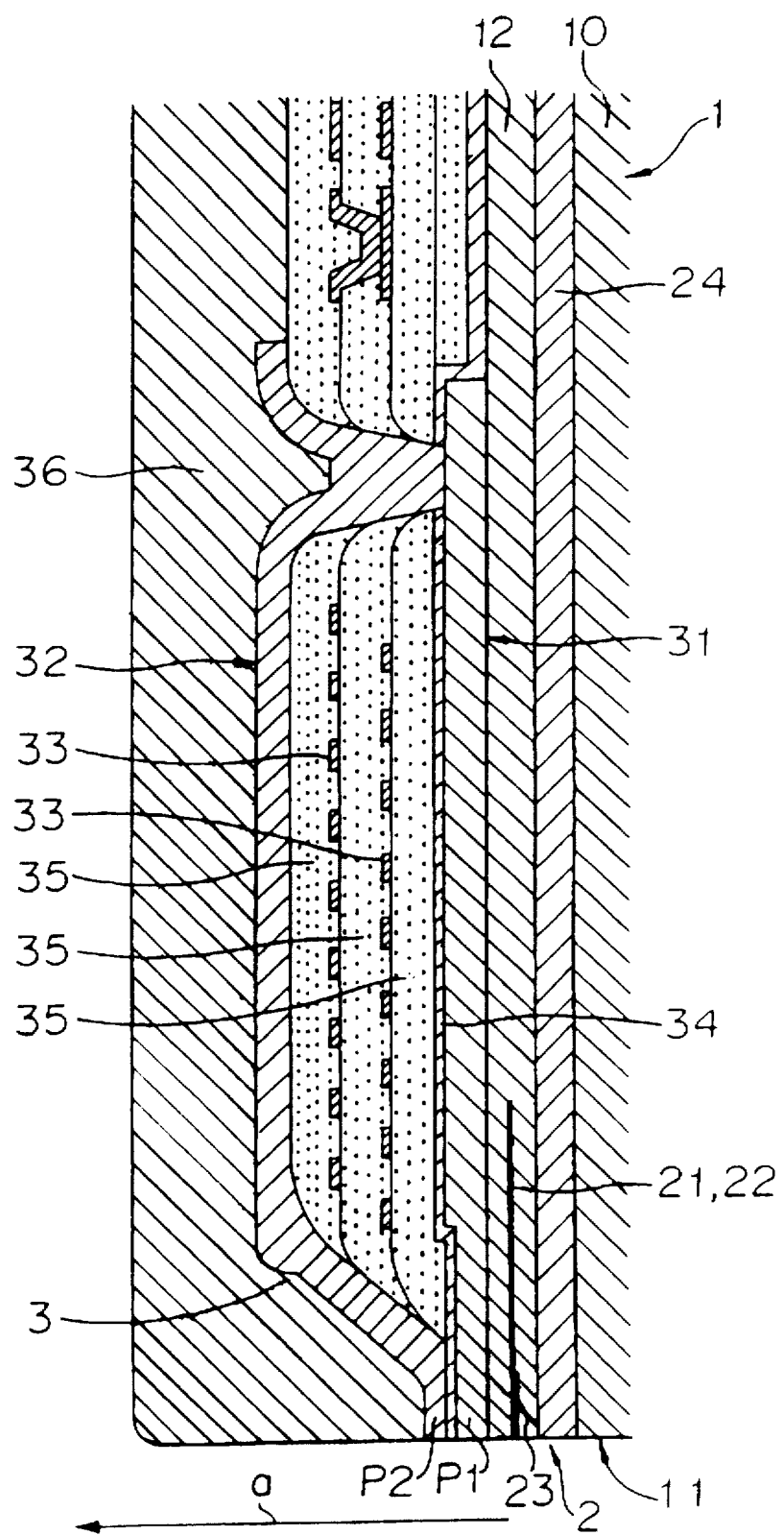
FIG. 4 is an enlarged sectional diagram of a thin film magnetic head.

FIG. 4 is a sectional diagram showing a specific example of the structure of the invented thin film magnetic head. In FIG. 4, the reference notations which are the same with those in FIGS. 1 and 2 designate the same or corresponding components. A numeral 3 designates a magnetic transducing element for writing.

The slider 1 is provided with the electrical insulating film 12 composed of alumina or the like on a substrate 10 which is a ceramic structure.

The magnetic transducing element for reading 2 is composed by embedding the magnetoresistive element 23 inside of the electrically insulating film 12 in a lamellar configuration. The magnetoresistive element 23 is formed by employing a ferromagnetic thin film material such as Ni—Fe, Ni—Co or the like. The sensing current I flows in the magnetoresistive element 23 through the conductor films 21 and 22 and a bias magnetic field is applied on the magnetoresistive element 23 to obtain detected signals having a good linearity with respect to an inputted magnetic field. As a means of generating the bias magnetic field, the shunt bias system wherein a bias conductor film is formed directly on the magnetoresistive element 23 and the bias magnetic field is supplied on the magnetoresistive element 23 by utilizing a magnetic field generated by a current flowing in the bias conductor film, the magnet bias system wherein a thin film permanent magnet is disposed adjacent to the magnetoresistive element 23 and a magnetic field generated by the thin film permanent magnet is utilized, or the like is adopted.

The lower magnetic shield film 24 is provided between the substrate 10 of the slider 1 and the electrically insulating film 12, and is constructed by a magnetic film of permalloy or the like. The upper magnetic shield film 25 is constructed by employing a lower magnetic film 31 of the magnetic transducing element for writing 3 as explained infra.

The magnetic transducing element for writing 3 includes the lower magnetic film 31, an upper magnetic film 32, coil films 33, a gap film 34 composed of alumina or the like, insulating films 35 composed of an organic resin such as a novolak resin and a protective film 36, which is laminated above the electrically insulating film 12. Front end portions of the lower magnetic film 31 and the upper magnetic film 32, are opposing pole portions P1 and P2 spaced apart from each other interposing the gap film 34 having a very small thickness, which performs the writing operation. Yoke portions of the lower magnetic film 31 and the upper magnetic film 32, which constitute a back gap portion disposed on the reverse side of the pole portions P1 and P2 are interconnected to complete a magnetic circuit. The coil films 33 are formed on the insulating films 35 in a spiral form around a connecting portion of the yoke portions. In this illustration, a magnetic head for reproducing a longitudinal magnetic recording is shown. However, a magnetic head for reproducing a perpendicular magnetic recording or the like can be employed.

Furthermore, the lower magnetic film 31 is also utilized as the upper magnetic shield film 25 of the magnetic transducing element for reading.

As stated above, in the invented thin film magnetic head, the two conductor films are contiguously arranged spaced apart from each other interposing the first spacing and the second spacing. The first spacing is disposed on the side of the air bearing surface and specifies the track width. The second spacing is disposed on the backward side of the first spacing. The magnetoresistive element is connected between the conductor films crossing the first spacing. In the magnetic shield films, the lower magnetic shield film is disposed on the lower side of the conductor films and the magnetoresistive element, whereas the upper magnetic shield film is disposed on the upper side of the conductor film and the magnetoresistive element. The conductor films are arranged so that the second spacing is equal to or less than 10 μm. Accordingly, the electromagnetic induction action generated by the single turn coil composed of the conductor film and the magnetoresistive element having the magnetic shield film as the core, is restrained and the variation of the read signal voltage is minimized.

We claim:

1. A thin film magnetic head having a slider and a magnetic transducing element for reading, wherein said slider is provided with an air bearing surface;

said magnetic transducing element for reading includes conductor films, a magnetoresistive element and magnetic shield films and is provided on the slider;

said conductor films are composed of first and second conductor films which extend to the air bearing surface of the slider and which are contiguously arranged interposing a first spacing having a first longitudinal extent and a second spacing having a second longitudinal extent, said first spacing being disposed on a side of said air bearing surface and defining a track width, said second spacing being disposed on a backward side of the first spacing, said conductor films applying a current to the magnetoresistive element;

said magnetoresistive element has a third longitudinal extent and is connected between the first and the second conductor films only at an area crossing the first spacing and prior to a beginning of the second spacing, wherein the third longitudinal extent of the magnetoresistive element is less than the first longitudinal extent of the first spacing;

said magnetic shield films include a lower magnetic shield film and an upper magnetic shield film, said lower magnetic shield film being located on a lower side of the conductor films and the magnetoresistive element and said upper magnetic shield film being located on an upper side of the conductor films and the magnetoresistive element; and the conductor films are arranged so that a size of the second spacing is greater than a size of the first spacing and is equal to or less than 10 μm.

2. The thin film magnetic head according to claim 1, wherein the conductor films are arranged so that the size of the second spacing is equal to or more than 5 μm.

3. The thin film magnetic head according to either one of claim 1 or claim 2, wherein inner end rims of the conductor films are of a linear form.

4. The thin film magnetic head according to either one of claim 1 or claim 2, which includes a magnetic transducing element for writing, said magnetic transducing element for writing having magnetic films and coil films constituting a magnetic circuit.

5. The thin film magnetic head according to claim 4, wherein said magnetic films include a lower magnetic film and an upper magnetic film, said upper magnetic film being provided above said lower magnetic film, front end portions of said upper and lower magnetic films being pole portions constituting a transducing gap, a backward side thereof being connected so as to complete a magnetic circuit and;

said coil films being formed in a spiral form around a connecting portion of the magnetic films.

* * * * *

UNITED STATES PATENT AND TRADEMARK OFFICE
CERTIFICATE OF CORRECTION

PATENT NO. : 5,768,065
DATED : June 16, 1998
INVENTOR(S) : Noriyuki ITO

It is certified that error appears in the above-identified patent and that said Letters Patent is hereby corrected as shown below:

On the title page, Item [63], the Related U.S. Application Data, is incorrect. It should read:

--Continuation of Ser. No. 984,510, Dec. 2, 1992, abandoned.--

Signed and Sealed this

Sixteenth Day of February, 1999

Attest:

*Acting Commissioner of Patents and Trademarks*

Attesting Officer